Patented Dec. 14, 1926.

1,610,549

UNITED STATES PATENT OFFICE.

SERBAN GEORGE CANTACUZENE, OF BUCHAREST, RUMANIA.

METHOD OF PROTECTING THE EXTERNAL SURFACES OF CONTAINERS FOR VOLATILE LIQUIDS AGAINST THE INFLUENCE OF HEAT RAYS.

No Drawing. Application filed May 28, 1925, Serial No. 33,513, and in Rumania May 31, 1924.

This invention relates to a method of protecting the exterior surfaces of containers such as tanks or reservoirs, whereby undesirable evaporation of volatile liquids such as crude petrol or its fractions is considerably diminished and reduced to a minimum.

The method aims at treating the exterior surfaces of containers so that the absorption of heat rays by such surfaces and the transfer of heat through the walls of the containers will be lessened, thereby causing a diminution in evaporation and loss of volatile liquids stored in the containers.

The surfaces of the containers are provided with a covering having its outer surface formed of a homogeneous material, which outer surface will itself reflect luminous and non-luminous heat rays as soon as they impinge thereon.

The coverings to be used in this invention are unlike those applied to the surfaces of containers, which comprise a pigment suitable for reflecting heat rays. In such coverings the pigment is enveloped in a drying liquid which after hardening remains transparent and does not allow of an immediate reflection of the heat rays at the surface of the covering but enables these rays to penetrate the transparent mass. The reflection of the heat rays in consequence takes place within the mass from the surfaces of the particles of pigment so that the temperature of the covering is increased to the detriment of the volatile liquids in the containers.

As is known, crude petroleum as it comes from the wells, is stored in metallic containers which are subject to the influence of solar heat, especially in summer. In consequence evaporation takes place with partial loss of benzine, thereby affecting adversely the value of the petroleum. The crude petroleum is conveyed through pipes to the distilling plant and again stored in metallic containers from which further evaporation and consequent loss of volatile constituents takes place. After distillation the various fractions are stored in containers from which evaporation also takes place, and finally, after the various operations such as rectification, refining, etc. which take place, the final products are stored in containers pending despatch. During this period the loss by evaporation in the case of the lighter fractions may be considerable.

The fractions on arrival at their destination are once more stored in containers, from which, unless they are underground and hermetically sealed, a further loss of volatile substances takes place. In addition to such losses there is a depreciation in value of the fractions owing to increases in density of the portions remaining.

The successive losses, in practice amount to a considerable quantity of material and are naturally very detrimental to the interests of people connected with the petroleum industry.

By means, however, of the method of this invention these losses are considerably reduced and the value of the products enhanced.

The heating of a metallic container being in part due to the surrounding hot air and in a greater part to the absorption of the non-luminous infra red rays, the problem which presented itself was to effect a covering of the outer surface of the metallic container with an agent possessing the requisite physical properties for reflecting the highest possible maximum of non-luminous heat rays, at the same time being capable of adhering sufficiently to the metallic surface and of withstanding atmospheric changes.

Experiments have shown that the cheapest agent which is suitable is lime applied as milk of lime. Such a material, however, presents the drawback that the layer of carbonate of lime which results does not sufficiently adhere to the metallic surface and fissures make their appearance. Moreover, the layer does not prevent the iron from rusting, but on the contrary, favours it. A layer of lime applied to oil-coated metal is also found to be lacking in sufficient adhesiveness.

According to the invention the method of protecting the exterior surfaces of containers for volatile liquids against the influence of atmospheric heat, thereby reducing losses due to evaporation, consists in treating the surfaces with a coating made up as follows:—

A layer or coating of an oil paint such as red lead in boiled linseed oil is applied to the exterior surfaces of a container and allowed to dry. Another layer or coating of a drying agent such as the same red lead—boiled linseed oil mixture, is next applied, and before it dries off a layer or coating of granular materials such as sifted dried sand, sawdust, powdered cork, powdered charcoal or the like or filamentous materials such as felt, wool, cotton, straw or like materials which should be bad heat conducting agents is projected on to the still liquid surface of the drying agent by hand or with the aid of apparatus working under compressed air. The drying agent with its coating of granular or filamentous material is then allowed to harden, after which a layer or coating of milk of lime is applied.

The layer of oil paint first applied serves to protect the metal against rust, while the layer of drying agent serves, on drying and hardening, to keep the layer or coating of granular or filamentous material, which in its turn serves to increase the insulating properties of the whole coating, in its position, and also for attaching the layer of lime which, itself, serves to reflect the greater portion of the heat rays.

The coating thus formed serves as an excellent heat insulating covering for the surfaces of the containers.

It is obvious that the method can be applied to surfaces which are already covered with paint and in this case only the second, third and fourth layers would be required.

Other substances can be added to the materials forming the respective layers which will increase their cohesion, adhesion, elasticity, resistance or duration of life.

If the first layer is sufficiently thick the granular or filamentous agent can be applied directly, thereby dispensing with the second application of drying agent, but it is best to let the first layer of paint dry before applying the granular or filamentous material to the second layer of drying agent so as to prevent the particles of the granular or filamentous material from actually contacting with the metal and perhaps setting up or facilitating the formation of rust.

The layer of lime can be applied in any known manner in one or several coats and can be renewed whenever necessary.

What I claim as new and desire to secure by Letters Patent is:—

The method of protecting the exterior surfaces of the containers of volatile liquids against the influence of atmospheric heat which consists in applying thereto a layer of oil paint and letting it dry, then applying a second similar layer and before it dries applying a layer of granular heat insulating material, and finally, after the drying of the second coat of paint with the granular material adhering thereto, applying an exterior coating of milk of lime.

In testimony whereof I affix my signature.

SERBAN GEORGE CANTACUZENE.